US012191107B2

(12) United States Patent
Ishii

(10) Patent No.: US 12,191,107 B2
(45) Date of Patent: Jan. 7, 2025

(54) MAGNETRON

(71) Applicant: Panasonic Intellectual Property Management Co., Ltd., Osaka (JP)

(72) Inventor: Takeshi Ishii, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 147 days.

(21) Appl. No.: 17/999,068

(22) PCT Filed: Jul. 7, 2021

(86) PCT No.: PCT/JP2021/025569
§ 371 (c)(1),
(2) Date: Nov. 17, 2022

(87) PCT Pub. No.: WO2022/024692
PCT Pub. Date: Feb. 3, 2022

(65) Prior Publication Data

US 2023/0187163 A1 Jun. 15, 2023

(30) Foreign Application Priority Data

Jul. 29, 2020 (JP) ................................ 2020-127997

(51) Int. Cl.
*H01J 23/00* (2006.01)
*H01J 23/15* (2006.01)
(Continued)

(52) U.S. Cl.
CPC ............ *H01J 23/15* (2013.01); *H01J 23/005* (2013.01); *H01J 25/50* (2013.01); *H01J 23/20* (2013.01); *H01J 23/22* (2013.01)

(58) Field of Classification Search
CPC .......... H01J 23/15; H01J 23/005; H01J 25/50; H01J 23/20; H01J 23/22
See application file for complete search history.

(56) References Cited

U.S. PATENT DOCUMENTS 6,844,680 B2 * 1/2005 Yoshihara ............... H01J 23/20
315/39.69
7,135,820 B2 * 11/2006 Shon ..................... H01J 23/213
315/39.51
(Continued)

FOREIGN PATENT DOCUMENTS

DE 102017217366 A1 * 4/2018 ........... H01F 27/025
JP 49-080153 U 7/1974
(Continued)

OTHER PUBLICATIONS

Extended European Search Report issued Jan. 3, 2024 in corresponding European Patent Application No. 21850921.4.
(Continued)

*Primary Examiner* — Tuan T Lam
(74) *Attorney, Agent, or Firm* — Wenderoth, Lind & Ponack, L.L.P.

(57) ABSTRACT

A magnetron includes an anode cylindrical body, a plurality of vanes, a cathode filament, an input-side magnetic pole, an output-side magnetic pole, and a choke structure. The anode cylindrical body has a cylindrical shape with an input-side opening part and an output-side opening part. The plurality of vanes is radially disposed from a central axis of the anode cylindrical body to an inner wall surface of the anode cylindrical body. The cathode filament is disposed along the central axis of the anode cylindrical body. The input-side magnetic pole and the output-side magnetic pole are disposed on the input-side opening part and the output-side opening part, respectively. The choke structure is seamlessly formed and disposed so as to cover an opening rim of the input-side magnetic pole with respect to the central axis of the anode cylindrical body.

4 Claims, 3 Drawing Sheets

(51) Int. Cl.

| | |
|---|---|
| ***H01J 25/50*** | (2006.01) |
| *H01J 23/20* | (2006.01) |
| *H01J 23/22* | (2006.01) |

(56) References Cited

U.S. PATENT DOCUMENTS

| | | | | |
|---|---|---|---|---|
| 2018/0096815 | A1* | 4/2018 | Kamiyama | H01J 23/20 |
| 2022/0275975 | A1* | 9/2022 | Torai | F25B 5/02 |

FOREIGN PATENT DOCUMENTS

| | | | |
|---|---|---|---|
| JP | 53-16572 | | 2/1978 |
| JP | 6-290712 | | 10/1994 |
| JP | 2000-164151 | | 6/2000 |
| JP | 2018-056078 | | 4/2018 |
| KR | 2000-0051133 | | 8/2000 |
| KR | 20030089308 | A * | 5/2002 |
| KR | 10-2003-0019137 | | 3/2003 |
| KR | 10-0487937 | | 5/2005 |

OTHER PUBLICATIONS

International Search Report of PCT application No. PCT/JP2021/025569 dated Sep. 7, 2021.

Office Action issued Jun. 14, 2023 in Indian Patent Application No. 202347001970, with English-language translation.

* cited by examiner

MAGNETRON

CROSS-REFERENCE TO RELATED APPLICATIONS

This application is a U.S. national stage application of the PCT International Application No. PCT/JP2021/025569 filed on Jul. 7, 2021, which claims the benefit of foreign priority of Japanese patent application No. 2020-127997 filed on Jul. 29, 2020, the contents all of which are incorporated herein by reference.

TECHNICAL FIELD

The present disclosure relates to a magnetron.

BACKGROUND ART

PTL 1 discloses a magnetron for microwave ovens that prevents electrical short-circuiting between a vane and a cathode filament and degradation of vacuum in a tube. The magnetron according to PTL 1 includes a plurality of vanes radially disposed from a central axis inside an anode cylinder and the cathode filament disposed along the central axis of the anode cylinder.

Both ends of the cathode filament are fixed onto respective end shields. A pole piece (magnetic pole) is fixed onto each of both openings of the anode cylinder. When a distance between the end shield and the vanes in an axial direction is defined as dimension A, and a distance between an inner peripheral end of the pole piece and the vanes in the axial direction is defined as dimension B, dimension A and dimension B are set to satisfy a predetermined relational expression.

PTL 2 discloses a high-output industrial magnetron in which an output-side magnetic pole and an input-side magnetic pole having a substantially funnel shape and a side tube are fixed onto both end openings of an anode cylinder. A heat sink and a choke structure are fixed onto the input-side magnetic pole. The heat sink releases heat generated from the input-side magnetic pole. The choke structure attenuates microwaves leaking to the cathode side.

CITATION LIST

Patent Literature

PTL 1: Unexamined Japanese Patent Publication No. H6-290712

PTL 2: Unexamined Japanese Patent Publication No. 2018-56078

SUMMARY OF THE INVENTION

Conventionally, in high-output industrial magnetrons of 2 kW or above, a heat sink and cylindrical choke structure are fixed onto an input-side magnetic pole inside a core tube. In general, the magnetic pole and the cylindrical choke structure are formed, for example, by punching a ferromagnetic sheet, such as a cold-rolled steel sheet, by press.

However, it is extremely difficult to fabricate a magnetic pole with complicated shape, such as deep drawing and stepped shape, even though a material for deep drawing is used. When the magnetic pole with complicated shape is fabricated, burr or sagging may occur.

Due to burr or sagging generated during press forming or variations related to component tolerances, coaxial deviation or accumulated filler metal may occur at fixing the magnetic pole and the cylindrical choke structure. Thus, it is difficult to fabricate a magnetic pole with dimension as designed. This has been one of factors causing a detrimental effect on characteristics, unstable operation, or short service life.

It is therefore an object of the present disclosure to provide a magnetron that can suppress generation of undesired protrusion and prevent in-tube discharge and degradation of in-tube vacuum.

The magnetron according to the present disclosure includes an anode cylindrical body, a plurality of vanes, a cathode filament, an input-side magnetic pole, an output-side magnetic pole, and a choke structure.

The anode cylindrical body has a cylindrical shape with an input-side opening part and an output-side opening part. The plurality of vanes is radially disposed from a central axis of the anode cylindrical body to an inner wall surface of the anode cylindrical body. The cathode filament is disposed along the central axis of the anode cylindrical body. The input-side magnetic pole and the output-side magnetic pole are disposed in the input-side opening part and the output-side opening part, respectively.

The choke structure is disposed inside an opening provided in the input-side magnetic pole. The choke structure is seamlessly formed and is disposed such that the choke structure covers an opening rim of the input-side magnetic pole with respect to the central axis of the anode cylindrical body.

The magnetron according to the present disclosure is capable of preventing in-tube discharge and degradation of in-tube vacuum.

DESCRIPTION OF EMBODIMENT

Basic Knowledge Behind the Present Disclosure

A problem described above has been known when the inventors arrived at the present disclosure. Therefore, in general, a person of ordinary skill in the art has aimed to design a distance between an end hat and a vane in an axial direction and a distance between the end hat and an inner peripheral end of an input-side magnetic pole in a radial direction within a predetermined range. This prevents a discharge that is generated between the end hat and the input-side magnetic pole of a cathode.

Under the circumstances, the inventors have reached an idea of preventing in-tube discharge at the inner peripheral end of the input-side magnetic pole, getting a hint from prevention of excessive flow of electrons (stray electrons) emitted from a cathode filament to the magnetic pole.

To embody the idea, it is necessary to suppress coaxial deviation at bonding the input-side magnetic pole and a cylindrical choke structure and generation of unevenness and protrusion due to accumulated filler metal. To solve this point, the inventors have reached a subject matter of the present disclosure.

The present disclosure provides a magnetron capable of preventing generation of in-tube discharge and resulting degradation of in-tube vacuum.

Hereinafter, an exemplary embodiment of the present disclosure will be described below with reference to the drawings. In the exemplary embodiment, description of known issues and duplicate description of identical or substantially identical configuration may be omitted.

Figure 1:
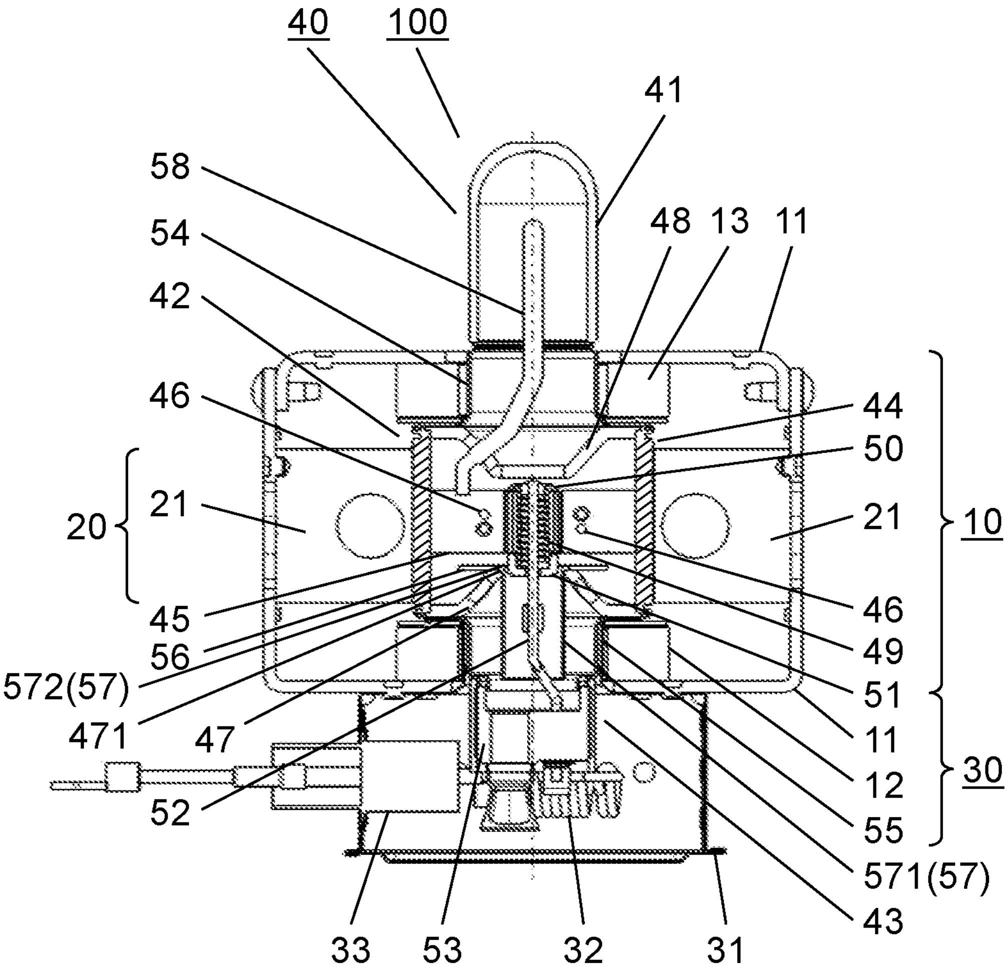
FIG. 1 is a sectional view of a magnetron according to an exemplary embodiment of the present disclosure.
Figure 2:
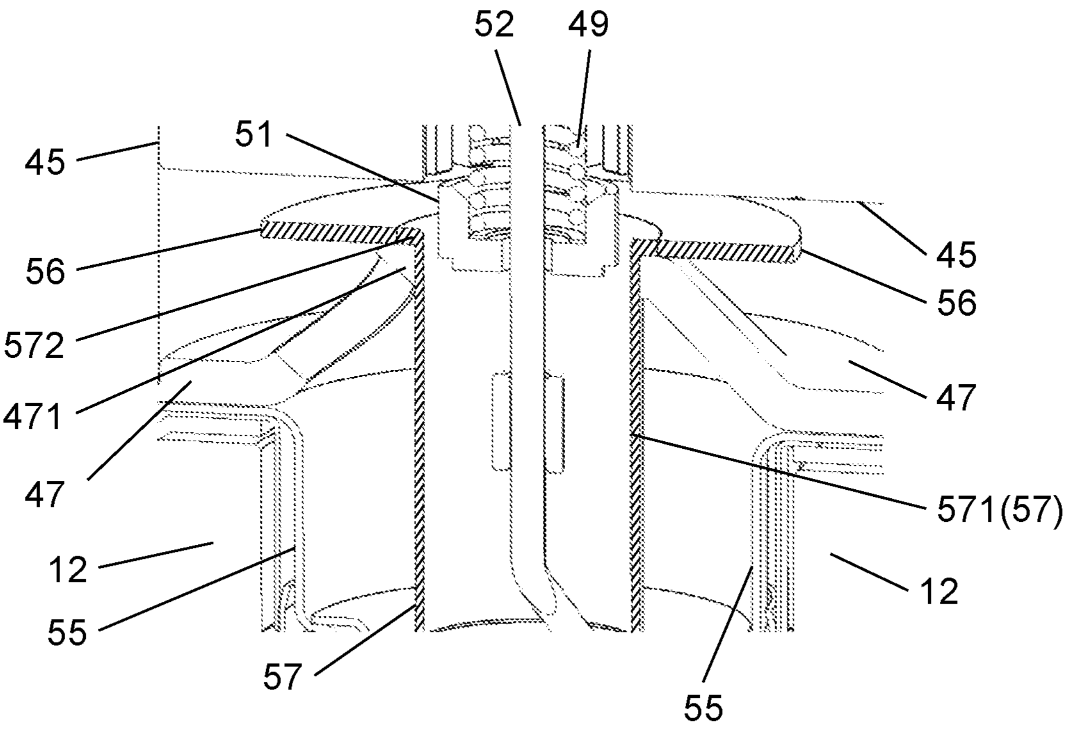
FIG. 2 is a sectional perspective view of a principal part of the magnetron according to the exemplary embodiment.

The exemplary embodiment will be described with reference to FIGS. 1 and 2. FIGS. 1 and 2 are a sectional view and a sectional perspective view of a principal part of magnetron 100 according to the exemplary embodiment.

Structure

Magnetron 100 according to the exemplary embodiment has an operating frequency in a 2450-MHz band and output of 2 kW or above. The operating frequency is not limited to the 2450-MHz band, and other operating frequencies, such as a 5.9-GHz band, are acceptable.

As illustrated in FIGS. 1 and 2, magnetron 100 includes magnetic circuit 10, cooling circuit 20, LC filter circuit 30, and core tube 40.

Magnetic circuit 10 includes yoke 11, input-side permanent magnet 12, and output-side permanent magnet 13. Input-side permanent magnet 12, output-side permanent magnet 13, and cooling circuit 20 are disposed inside yoke 11. LC filter circuit 30 is disposed inside filter case 31, and includes choke coil 32 and capacitor 33.

Core tube 40 includes output part 41, anode 42, and cathode 43. Anode 42 includes fourteen vanes 45 made of copper and disposed on an inner wall surface of anode cylindrical body 44. Vanes 45 are radially arranged at equal intervals from a central axis of anode cylindrical body 44 to the inner wall surface of anode cylindrical body 44.

Vanes 45 form a LC circuit. Each of two strap rings 46 is electrically connected to seven every other vanes 45 in total. Anode cylindrical body 44 has an input-side opening part and an output-side opening part. The input-side opening part and the output-side opening part have input-side magnetic pole 47 and output-side magnetic pole 48 that have a substantially funnel shape, respectively. This configures a cavity resonator.

Input-side magnetic pole 47 and output-side magnetic pole 48 effectively direct a magnetic field into an interaction space that is a space between an inner surface of vanes 45 and cathode filament 49 described later. Each of input-side magnetic pole 47 and output-side magnetic pole 48 has an opening created at a center. The central axis of anode cylindrical body 44 passes through the opening in input-side magnetic pole 47 and output-side magnetic pole 48.

Heat sink 56 that releases heat and choke structure 57 are bonded by brazing onto opening rim 471 of input-side magnetic pole 47. Choke structure 57 has a cylindrical choke structure so as to attenuate microwaves that leak to the cathode side. Input-side magnetic pole 47 is electrically connected to heat sink 56 and choke structure 57.

Choke structure 57 has cylindrical part 571 and flange part 572. Flange part 572 is bent to extend in a radial direction of the opening in input-side magnetic pole 47. Cylindrical part 571 and flange part 572 are disposed on a side end of input-side magnetic pole 47 such that cylindrical part 571 and flange part 572 cover opening rim 471 of input-side magnetic pole 47 with respect to the central axis of anode cylindrical body 44. Cylindrical part 571 and flange part 572 are seamlessly formed.

In the exemplary embodiment, flange part 572 of choke structure 57 is formed by bending. However, as long as flange part 572 and cylindrical part 571 are seamlessly formed, flange part 572 may be formed by, for example, cutting.

Brazing for bonding is performed using a jig. Therefore, due to positional relationship of components and influence of component tolerances, input-side magnetic pole 47, heat sink 56, and choke structure 57 may be bonded at positions deviated from designed coaxial positions. The deviation and accumulated filler metal at a bonded part may adversely affect characteristics of magnetron 100. For example, in-tube discharge may occur at an inner peripheral end of input-side magnetic pole 47.

Therefore, choke structure 57 seamlessly covers input-side magnetic pole 47 to suppress coaxial deviation at bonding and accumulation of filler metal at the bonded part. Input-side magnetic pole 47, heat sink 56, and choke structure 57 at the bonded part are disposed facing each other. Since spaces between input-side magnetic pole 47, heat sink 56, and choke structure 57 are mutually communicated, filler metal needed for bonding can be reduced.

In the exemplary embodiment, fourteen vanes 45 are provided. However, the number of vanes is not limited thereto. For example, ten copper vanes may be radially arranged at equal intervals from the central axis of anode cylindrical body 44.

In cathode 43 in an electron interaction space surrounded inside of vanes 45, cathode filament 49 is spirally disposed along the central axis of anode cylindrical body 44. Output-side end hat 50 and input-side end hat 51 are fixed to both ends of cathode filament 49, respectively. Output-side end hat 50 and input-side end hat 51 are supported by center lead 52 and side lead (not illustrated), respectively, and fixed onto cathode stem 53 of an input part.

Side tube 54 and side tube 55 are fixed to output-side magnetic pole 48 and input-side magnetic pole 47, respectively. Output part 41 and cathode stem 53 are provided on side tubes 54 and 55, respectively, in a protruding manner.

Input-side permanent magnet 12 and output-side permanent magnet 13 are coaxially disposed around side tubes 54 and 55, respectively. Normally, cooling block 21 that is cooling circuit 20 is provided on an outer periphery of anode cylindrical body 44. Yoke 11 is disposed to surround cooling block 21, input-side permanent magnet 12, and output-side permanent magnet 13. One end of antenna 54 is electrically connected to one of vanes 45. Antenna 58 passes through output-side magnetic pole 48 and extends along a tube axis of core tube 40 to configure output part 41.

Operation

The operation of magnetron 100 as configured above will be described with reference to FIG. 1.

Thermoelectrons emitted from cathode filament 49 orbit in a cavity interaction space formed between vanes 45 and cathode filament 49. This causes magnetron 100 to oscillate a microwave.

The microwave is transmitted to one of vanes 45, and also to antenna 58 connected to one of vanes 45. Then, the microwave is released to an external space. However, a conversion efficiency is not 100%. Heat will be generated by electrons not contributing to oscillation of the microwave. As a result, a temperature near the interaction space increases, and the oscillation may become unstable.

The microwave not released to the external space leaks to the cathode side. This causes adverse effects such as unstable oscillation and a detrimental effect on drive power supply. These adverse effects become more obvious as the output becomes larger.

As a measure against the adverse effects, the temperature rise caused by electrons not contributing to microwave oscillation is suppressed by heat sink 56 disposed on input-side magnetic pole 47 via anode cylindrical body 44 and cooling block 21.

The microwave leaking to the cathode side is attenuated by disposing choke structure 57 provided on input-side magnetic pole 47 at a position coaxial to center lead 52.

In the structure of magnetron 100, electrons (stray electrons) released from cathode filament 49 excessively enter input-side magnetic pole 47 due to a coaxial arrangement of cathode 43, input-side magnetic pole 47, and choke structure 57. Accordingly, in-tube discharge occurs at the inner peripheral end of input-side magnetic pole 47. As a result, in-tube vacuum degrades, thereby giving a detrimental effect on characteristics.

In the exemplary embodiment, the inner peripheral end of input-side magnetic pole 47 is covered with choke structure 57. Accordingly, although burr or sagging occurs during press-forming of input-side magnetic pole 47 and choke structure 57, coaxial deviation of input-side magnetic pole 47 and choke structure 57 at bonding can be suppressed. Still more, unevenness and protrusion caused by accumulated filler metal can also be suppressed.

Effect

In the exemplary embodiment, the inner peripheral end of input-side magnetic pole 47 is covered with choke structure 57 formed integrally with input-side magnetic pole 47. Accordingly, coaxial deviation that may occur at bonding input-side magnetic pole 47 and choke structure 57 can be suppressed, and unevenness and protrusion caused by accumulated filler metal can be suppressed As a result, in-tube discharge and degradation of in-tube vacuum can be prevented.

First Modified Example

Figure 3:
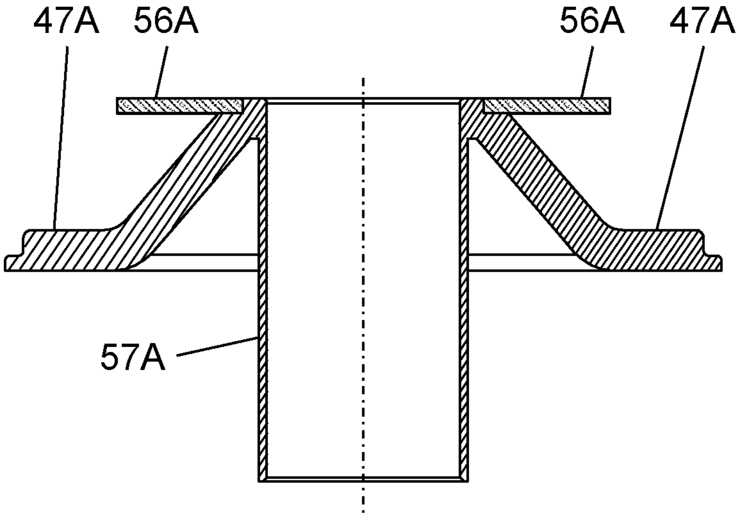
FIG. 3 is a sectional view of a principal part of a magnetron according to a first modified example of the exemplary embodiment.

FIG. 3 is a sectional view of a principal part of a first modified example according to the exemplary embodiment. As illustrated in FIG. 3, the first modified example includes input-side magnetic pole 47A, heat sink 56A, and choke structure 57A instead of input-side magnetic pole 47, heat sink 56, and choke structure 57 in the above exemplary embodiment.

In the first modified example, input-side magnetic pole 47A is integrally formed with choke structure 57A. Accordingly, coaxial deviation that may occur at bonding input-side magnetic pole 47A and choke structure 57A can be suppressed, and unevenness and protrusion caused by accumulated filler metal can be suppressed As a result, in-tube discharge and degradation of in-tube vacuum can be prevented.

Second Modified Example

Figure 4:
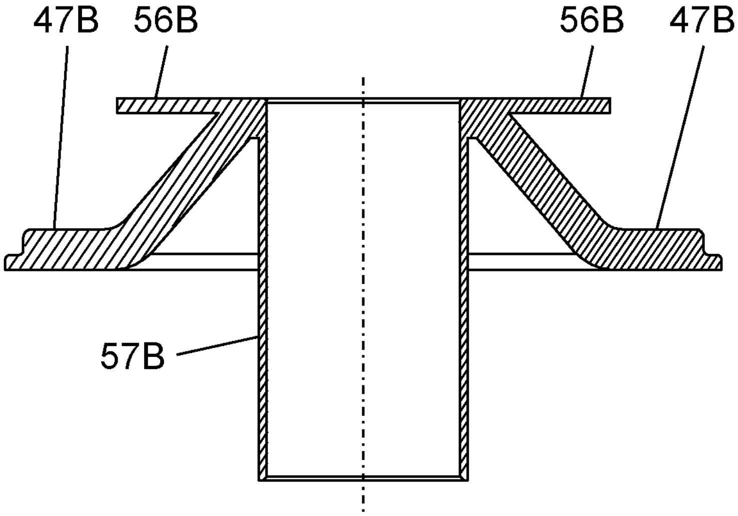
FIG. 4 is a sectional view of a principal part of a magnetron according to a second modified example of the exemplary embodiment.

FIG. 4 is a sectional view of a principal part of a second modified example according to the exemplary embodiment. As illustrated in FIG. 4, the second modified example includes input-side magnetic pole 47B, heat sink 56B, and choke structure 57B instead of input-side magnetic pole 47, heat sink 56, and choke structure 57 in the above exemplary embodiment.

In the second modified example, input-side magnetic pole 47B is integrally formed with choke structure 57B and heat sink 56B in a seamless manner. Accordingly, coaxial deviation that may occur at bonding input-side magnetic pole 47B and choke structure 57B can be suppressed, and unevenness and protrusion caused by accumulated filler metal can be suppressed As a result, in-tube discharge and degradation of in-tube vacuum can be prevented.

INDUSTRIAL APPLICABILITY

The present disclosure is applicable to magnetrons and microwave products using magnetron. The microwave products include artificial diamond generating apparatuses, radar apparatuses, medical equipment, cooking apparatuses such as microwave ovens, and semiconductor manufacturing equipment.

REFERENCE MARKS IN THE DRAWINGS

100 magnetron
10 magnetic circuit
11 yoke
12 input-side permanent magnet
13 output-side permanent magnet
20 cooling circuit
21 cooling block
30 LC filter circuit
31 filter case
32 choke coil
33 capacitor
40 core tube
41 output part
42 anode
43 cathode
44 anode cylindrical body
45 vane
46 strap ring
47, 47A, 47B input-side magnetic pole
471 opening rim
48 output-side magnetic pole
49 cathode filament
50 output-side end hat
51 input-side end hat
52 center lead
53 cathode stem
54, 55 side tube
56, 56A, 56B heat sink
57, 57A, 57B choke structure
571 cylindrical part
572 flange part
58 antenna

The invention claimed is:

1. A magnetron comprising:

an anode cylindrical body having a cylindrical shape with an input-side opening part and an output-side opening part;

a plurality of vanes radially disposed from a central axis of the anode cylindrical body to an inner wall surface of the anode cylindrical body;

a cathode filament disposed along the central axis of the anode cylindrical body;

an input-side magnetic pole and an output-side magnetic pole disposed on the input-side opening part and the output-side opening part, respectively; and a choke structure disposed inside an opening provided in the input-side magnetic pole, wherein the choke structure is seamlessly formed and covers an opening rim of the input-side magnetic pole with respect to the central axis of the anode cylindrical body.

2. The magnetron of claim 1 further comprising a heat sink bonded to the input-side magnetic pole, wherein the input-side magnetic pole, the heat sink, and the choke structure are disposed facing each other, and spaces between the input-side magnetic pole, the heat sink, and the choke structure are mutually communicated.

3. The magnetron of claim 1, wherein the input-side magnetic pole is seamlessly formed with the choke structure.

4. The magnetron of claim 1, wherein the input-side magnetic pole is seamlessly formed with the choke structure and the heat sink.

* * * * *